United States Patent [19]

Chitwood

[11] Patent Number: 4,722,511
[45] Date of Patent: Feb. 2, 1988

[54] TOILET LIFT TRUCK

[76] Inventor: Ralph Chitwood, 2253 Camrose Ave., San Jose, Calif. 95130

[21] Appl. No.: 756,642

[22] Filed: Jul. 19, 1985

[51] Int. Cl.⁴ .............................................. B60P 1/10
[52] U.S. Cl. ..................................... 254/7 R; 254/134
[58] Field of Search ................. 414/10, 495; 254/2 R, 254/2 B, 4 R, 4 B, 6 R, 6 B, 7 R, 7 B, 45, 133, 134; 269/17, 296, 76

[56] References Cited

U.S. PATENT DOCUMENTS

| | | | |
|---|---|---|---|
| 1,826,493 | 10/1931 | Bahrman | 269/296 |
| 3,215,402 | 11/1965 | Hott et al. | 254/7 B |
| 3,391,905 | 7/1968 | Burns | 254/7 B |
| 3,858,864 | 1/1975 | Waldow | 269/17 |
| 4,183,511 | 1/1980 | Marek | 269/17 |
| 4,491,452 | 1/1985 | Matovich | 254/4 R |

*Primary Examiner*—Robert C. Watson
*Attorney, Agent, or Firm*—William W. Burns

[57] ABSTRACT

A lifting and transporting device for toilets includes a wheeled frame to which a pair of moveable lifting bars are attached. Moveable support collars and adjustable lifting rods are attached to the lifting bars, and the collars and rods are selectively positionable about a toilet to perform a holding and supporting function. The lifting bars are selectively vertically moveable by a hand actuated threaded rod. After a toilet has been lifted from the floor, it can be transported by the invention to a desired location and then lowered into position by a reverse operation of the threaded lifter.

4 Claims, 3 Drawing Figures

TOILET LIFT TRUCK

BACKGROUND OF THE INVENTION

1. Field of the Invention

The present invention relates to lifting and transporting devices, and more particularly pertains to a new and improved lifting and transporting assembly for toilets.

2. Description of the Prior Art

The lifting and moving of toilets is frequently a cumbersome and difficult operation. Not only are the toilets heavy, they are awkwardly designed so that they tend to easily tip over and break. Typically, a moving operation requires at least two individuals so that the toilet can be safely balanced and lifted at the same time. In those situations where only a single individual is available for moving a toilet, a conventional procedure is to completely disassemble the toilet whereby the water holding tank is completely removed from the bowl, thereby to divide the toilet into substantially two different sections. As can be appreciated, breaking a toilet down into pieces for the purpose of carrying it to a selected location is undesirable due to the large amount of time and effort required to accomplish such an undertaking.

Of course, various lifting devices are available which could conceiveably be utilized to facilitate the transporting of a toilet assembly. For example, dolly carts can on occasion be utilized, although there is some difficulty experienced in getting a toilet to fit on the bottom lift plate of such a cart. Similarly, various wheeled flat carts, such as a mechanic's creeper, or the like, can be used somewhat successfully to move a toilet, although these types of carts do not provide for any type of toilet holding and supporting structure whereby the toilet can be safely moved while sitting in an upright position. Further, all of these types of carts require the manual lifting of an existing toilet so that the same can be placed on the cart prior to transporting. Once the toilet has been moved by means of the cart to the desired location, it must again be manually lifted off of the cart for positioning. As such, it can be appreciated that there is a continuing need for new and improved lifting and transporting devices for toilets whereby no manual lifting by an individual would be required and in this respect, the present invention substantially fulfills this need.

SUMMARY OF THE INVENTION

The general purpose of the present invention, which will be described subsequently in greater detail, is to provide a new and improved toilet lift truck which has all of the advantages of prior art lifting devices and none of the disadvantages. To attain this, the present invention envisions a toilet supporting frame which is provided with wheels, thereby to facilitate the movement of a toilet placed thereon, with such frame further including at least a pair of lifting bars that are vertically adjustable with respect thereto. The supporting frame may be wheeled into position along the opposed sides of a toilet, and the lifting bars are then vertically adjustable by means of a threaded handcrank into a desired aligned position. Support collars are moveable along the lifting bars and are abuttable with a curved portion of the toilet bowl, while a pair of adjustable lift rods are similarly attached to the support bars, with such lifting rods being selectively abuttable in proximity to the toilet water tank.

Once the support collars and lifting bars have been selectively positioned as desired, a further manipulation of the threaded lifting actuator will result in the toilet assembly being lifted from its supporting surface. With the toilet being totally supported by the support frame, a user may then transport the toilet to a desired location and lower it into position through a reverse actuation of the crank member. While transporting the toilet, a water catch tray is attachable to the support frame and is positioned beneath the toilet to prevent water damage to surrounding floors.

There has thus been outlined, rather broadly, the more important features of the present invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures for carrying out the several purposes of the present invention. It is important, therefore, that the claims be regarded as including such equivalent constructions so far as they do not depart from the spirit and scope of the present invention.

It is therefore an object of the present invention to provide new and improved toilet lift trucks which have all the advantages of prior art lifting devices and none of the disadvantages.

It is another object of the present invention to provide new and improved toilet lift trucks which may be easily and efficiently manufactured and marketed.

It is a further object of the present invention to provide new and improved toilet lift trucks which may be efficiently and reliably assembled in a rapid manner.

Even another object of the present invention is to provide new and improved toilet lift trucks which are of a durable and rugged construction.

Still another object of the present invention is to provide new and improved toilet lift trucks which permit the lifting, transporting and subsequent positioning of a toilet without the necessity of any manual lifting being performed by the moving individual.

Still yet another object of the present invention is to provide a new and improved toilet lift truck which is characterized by a portable and lightweight construction, whereby the same can be conveniently transported, stored, assembled and disassembled.

Even yet another object of the present invention is to provide a new and improved toilet lift truck which is susceptible of a low cost of manufacture with regard to both materials and labor, and which accordingly is then susceptible of low prices of sale to the consuming public, thereby making such devices economically available to the buying public.

Even still another object of the present invention is to provide a new and improved toilet lift truck which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
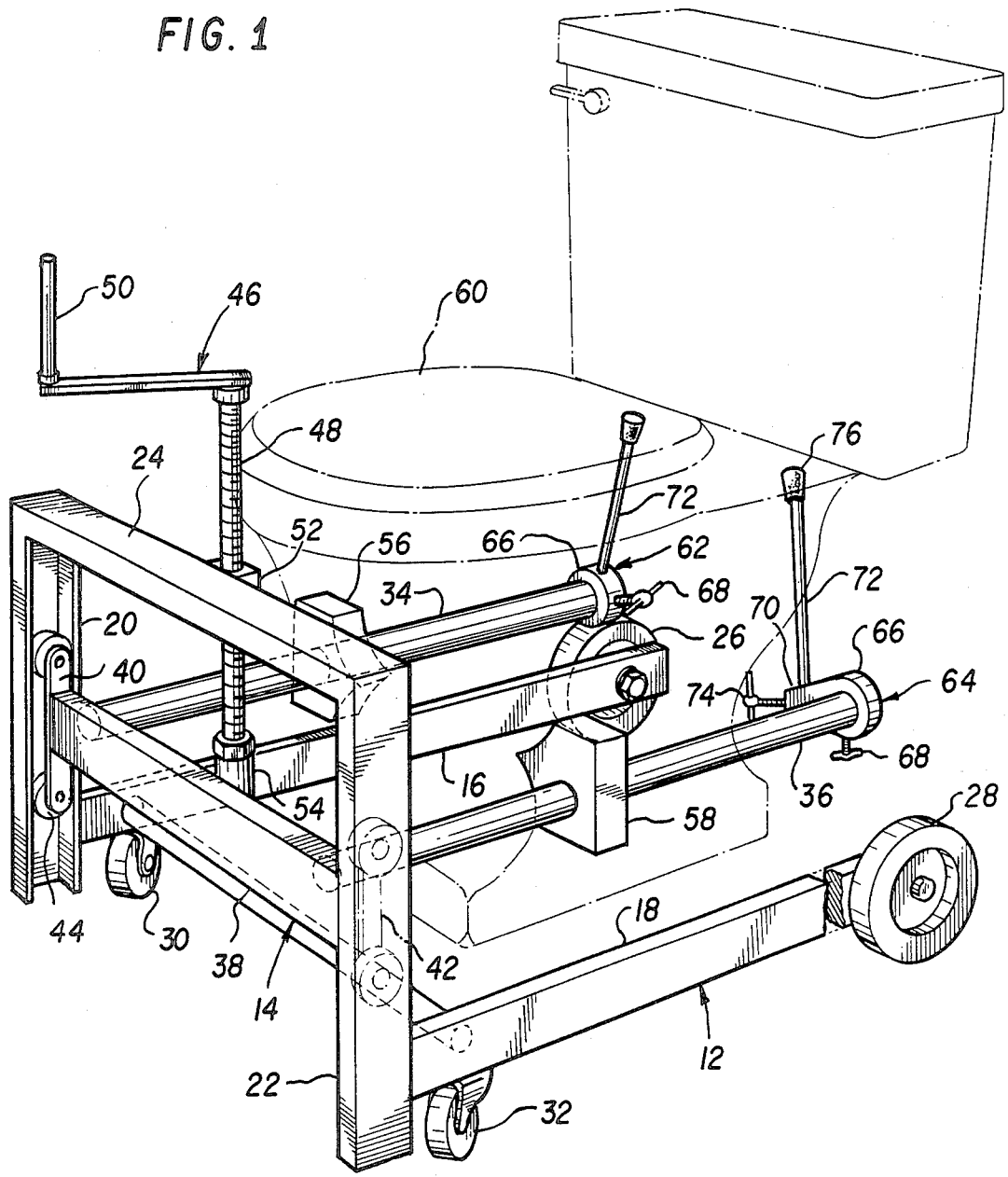
FIG. 1 is a perspective view of the toilet lift truck comprising the present invention.
Figure 2:
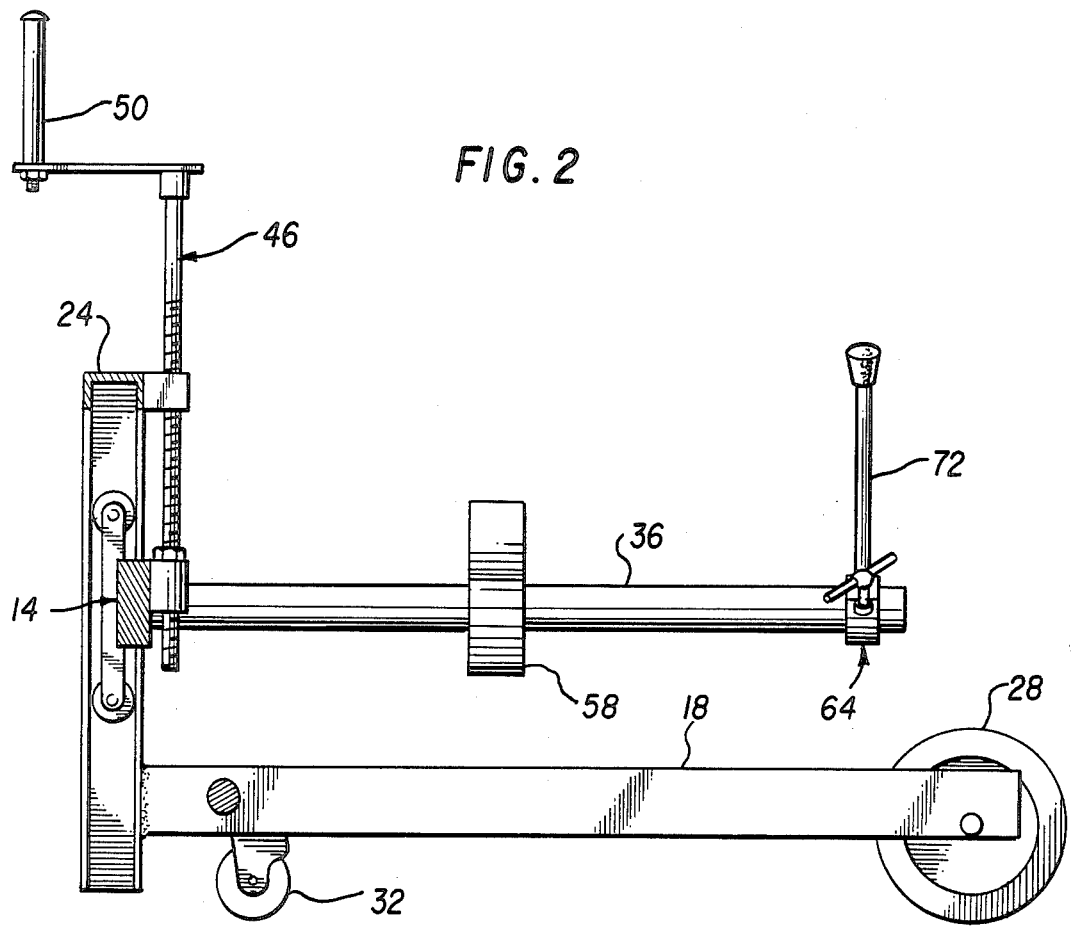
FIG. 2 is a side elevation view of the invention.
Figure 3:
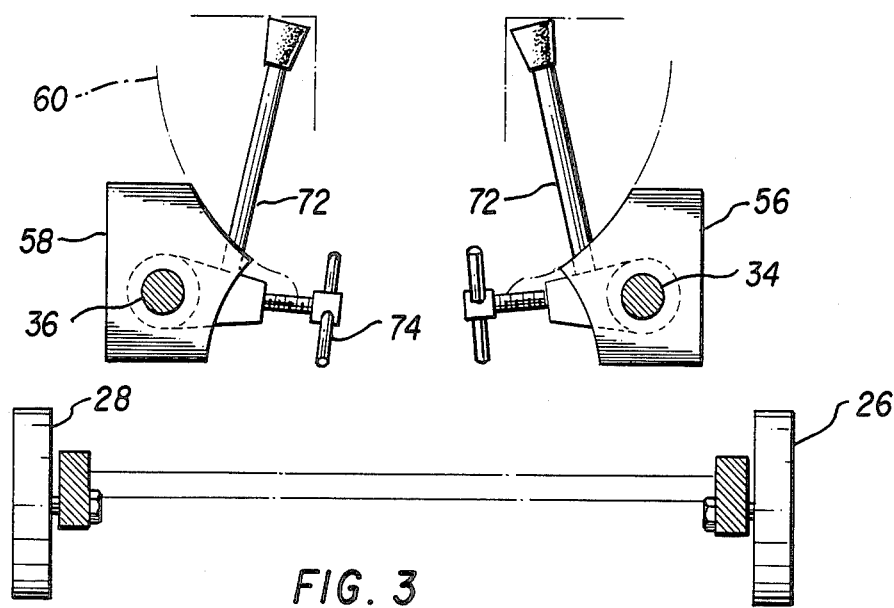
FIG. 3 is a partial end elevation view thereof.

With reference now to the drawings and in particular to FIGS. 1-3 thereof, a new and improved toilet lift truck embodying the principles and concepts of the present invention and generally designated by the reference numeral 10 will be described. In this respect, it will be noted from the drawings that the lift truck 10 includes a support frame structure 12 having an adjustably moveable lifting bar assembly 14 operably attached thereto. The support frame 12 includes a pair of paralleledly-aligned, spaced-apart support members 16, 18, with such members having respective upstanding vertical support members 20, 22 fixedly attached thereto. The upstanding support members 20, 22 are fixedly secured together by a cross-extending support member 24, with all of the members 16, 18, 20, 22, 24 being secured together by any conventional and known attachment means, such as welding, threaded fasteners, or the like.

To facilitate the movement of the support frame assembly 12, the support members 16, 18 are provided with respective wheels 26, 28 operably attached to free ends thereof, and are further provided with respective multi-positionable casters 30, 32 on opposed ends thereof. The support frame 12 is totally supported by the wheels 26, 28 and the casters 30, 32, and is thus easily moveably positionable as desired.

With respect to the lifting bar assembly 14, it will be noted that the upstanding support members 20, 22 are of an opposed and facing U-channel construction whereby the support members operate as a guiding means for the aforementioned lifting bar assembly 14. In this respect, it will be observed that the lifting bar assembly 14 includes a pair of paralleledly-aligned, spaced-apart bars 34, 36 which are fixedly secured at free ends thereof to a cross-extending member 38. The member 38 has orthogonally aligned plates 40, 42 fixedly attached to opposed ends thereof, whereby a plurality of rollers or wheels 44 may be secured thereto in some conventional manner, with such wheels then being operably guidingly moveable within the interior channel portions of the respective upstanding support members 20, 22. While two wheels 44 are illustrated as being attached to each opposed end of the cross-extending member 38, it is to be understood that any number of such guiding wheels could be employed with the same being within the intent and purview of the present invention.

As best shown in FIGS. 1 and 2 of the drawings, a hand crank assembly 46 is operably employed to move the cross-extending member 38 upwardly or downwardly within the upstanding support members 20, 22. In this respect, the assembly 46 includes a threaded member 48 which may be operably rotated by a handle 50 fixedly secured thereto. The threaded member 48 is thredably moveable through a block 52 fixedly attached to the cross-extending member 24 while being rotatably retained within and attached to a further block 54 operably secured to the cross-extending member 38. As such, a manual rotation of the hand crank assembly 46 will then result in an upward or downward movement of the cross-extending member 38 within the channel members 20, 22.

With respect to the spaced-apart, paralleledlyaligned support bars 34, 36, it will be observed that adjustably moveable bowl support collars 56, 58 may be respectively frictionally retained thereon. In this regard, the support collars 54, 56 may be frictionally slid along the axial length of the respective support bars 34, 36 and are desirably shaped and designed to conform to the shape of a conventional toilet bowl 60 as illustrated in phantom lines in FIG. 1. While these support collars 56, 58 have been illustrated as being of one particular design and shape to perform their bowl supporting function, it is to be understood that said moveable bowl support collars shall have a multiplicity of curved shapes to confirm in abutting engagement with a multiplicity of curvilinear toilet surfaces, and that it is to be further understood that all conceivable shapes which would perform the function of the present invention are within the intent thereof. Further, while a frictional slidable engagement of the collars 56, 58 to their respective support bars 34, 36 has been illustrated, it is also within the context of the invention to include any type of adjustment means which would permit a movement of the collars along the bars and which could further serve to lockably position the collars thereto once they have been positioned as desired, and still further the collars 56, 58 shall be formed of material, such as hard rubber which is firm, but less rigid than the porcelain or ceramic of a toilet to insure that the toilet will not be damaged when lifted. The combination of support collars and lifting bars combine to securely cradle the toilet which is straddled by the lifting bars.

Referencing FIGS. 1, 2 and 3 of the drawings, it will be seen that the invention further includes a pair of lifting rod assemblies 62, 64 operably, adjustably positionable on free ends of the respective support bars 34, 36. The lifting rod assemblies 62, 64 are identical in construction and each includes a lifting bar collar 66 which is adjustably moveable along a particular support bar 34 and which may be lockably attached to such support bar by a threaded locking means 68 once the particular lifting rod assemblies 62, 64 has been positioned as desired. The shape of a particular lifting rod assembly 62, 64 includes an extended portion 70 which includes a through-extending aperture that slidably retains a lifting rod 72. The lifting rod 72 is slidably adjustable through the extended portion 70 to a desired length and may then be lockably positioned within the aperture by a threaded locking member 74. A toilet-abutting free end of a lifting rod 72 may be provided with a lifting rod pad 76 which operates to prevent damage to a toilet bowl 60 during a lifting and transporting operation.

While the manner of operation of the above-described invention should now be abundantly apparent from the foregoing description, a brief summary of the operation will be provided. In this respect, it can be appreciated that when it is desired to lift and transport a toilet 60 from one location to another, the toilet lift truck 10 may be positioned about a toilet as shown in FIG. 1. In this connection, the lift truck 10 may be wheeled into position whereby the support members 16, 18 are positioned on opposite sides of the toilet 60. The bowl support collars 56, 58 can then be slid along the support bars 34, 36 into position proximate the underside of bowl portion of the toilet 60 and by a manual rotation of the hand crank assembly 46, the support collars can be brought into lifting engagement with the toilet per se. Similarly, the lifting rods 62, 64 can be adjustably positioned and locked in place by the threaded locking member 68 with the lifting rods 72 then being slid upwardly into engagement with a back portion of the toilet 60. Once the lifting rods 72 are in engagement with the toilet 60, they can be locked in position by the threaded locking members 74.

A further manual rotation of the hand crank assembly 46 will then result in the assembly 14 lifting the toilet 60 off of its supporting surface so that the toilet lift truck 10 may be wheeled to a different location where it is desired to deliver the toilet 60. A reverse operation of the above-described procedure will then result in the toilet 60 being released from the toilet lift truck 10 in a now apparent manner.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved toilet lift truck assembly comprising:
   a support frame means;
   wheel means operably attached to said support frame means for guidably moving said support frame means;
   lifting bar means having paralleledly aligned bars operably positionable on opposed sides and below the bowl of a toilet;
   a rotatable threaded member secured in said support frame for slidably raising and lowering said lifting bar means with respect to the support frame;
   a first frictionally retained, slidably movable, rotatable collar on each said bar having a multiplicity of curved conforming shapes for abutting engagement with a curvilinear surface of a toilet; and
   a second slidably movable, rotatable collar on each said bar, including a lifting rod adjustable secured to said second collar, for support of the rear portion of the toilet.

2. The new and improved toilet lift truck assembly as described in claim 1, wherein said rotatable threaded member includes a screw turnable by a manual crank means.

3. The new and improved toilet lift truck assembly as described in claim 1, wherein said first collar consists of a firm material, less rigid than the procelain or ceramic material of a toilet.

4. The new and improved toilet lift truck assembly as described in claim 1, wherein said lifting bar means, said first collar, and said lifting rod cooperate to cradle the toilet.

* * * * *